(12) United States Patent
Anderson et al.

(10) Patent No.: US 7,352,428 B2
(45) Date of Patent: *Apr. 1, 2008

(54) LIQUID CRYSTAL CELL PLATFORM

(75) Inventors: Grady K. Anderson, Santa Rosa, CA (US); Shanti A. Cavanaugh, Santa Rosa, CA (US); James M. Hood, Petaluma, CA (US); Louis J. Molinari, Windsor, CA (US); Mark E. Young, Santa Rosa, CA (US); Edward Palen, Redwood City, CA (US)

(73) Assignee: Xtellus Inc., Morris Plains, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/371,235

(22) Filed: Feb. 21, 2003

(65) Prior Publication Data

US 2004/0165139 A1     Aug. 26, 2004

(51) Int. Cl.
*G02F 1/1339* (2006.01)
*G02F 1/1333* (2006.01)

(52) U.S. Cl. .......................... 349/153; 349/155; 349/161
(58) Field of Classification Search ........ 349/153–155, 349/190, 161
See application file for complete search history.

(56) References Cited

U.S. PATENT DOCUMENTS

| | | | |
|---|---|---|---|
| 3,637,291 A * | 1/1972 | Kessler et al. ................ 349/21 |
| 4,135,789 A | 1/1979 | Hall | |
| 4,148,128 A | 4/1979 | Feldman | |
| 4,165,157 A | 8/1979 | Kobale | |
| 4,310,220 A | 1/1982 | Kuwagaki | |
| 4,315,668 A | 2/1982 | Aftergut | |
| 4,410,238 A | 10/1983 | Hanson | |
| 4,545,650 A | 10/1985 | Kirkman | |
| 4,556,289 A | 12/1985 | Fergason | |
| 4,634,225 A | 1/1987 | Haim | |
| 5,013,140 A | 5/1991 | Healey | |
| 5,015,057 A | 5/1991 | Rumbaugh | |
| 5,088,806 A | 2/1992 | McCartney | |
| 5,150,236 A | 9/1992 | Patel | |
| 5,276,747 A | 1/1994 | Pan | |
| 5,396,355 A * | 3/1995 | Wada et al. ................ 349/117 |
| 5,414,541 A | 5/1995 | Patel | |
| 5,430,561 A | 7/1995 | Kato | |

(Continued)

FOREIGN PATENT DOCUMENTS

JP          62-058221 A        3/1987

(Continued)

OTHER PUBLICATIONS

Supplementary Partial European Search Report mailed on Aug. 16, 2006, for European patent application No. EP 04713483 filed on Feb. 21, 2004, 5 pages.

(Continued)

*Primary Examiner*—Dung T. Nguyen
(74) *Attorney, Agent, or Firm*—Morrison & Foerster LLP

(57) ABSTRACT

A liquid crystal cell is presented that utilizes a deposited metal gasket moisture barrier and support membrane bonding two opposing plates of glass, a thin film spacer layer to accurately control cell gap thickness, and an optional integrated thermal sensor and heater deposition layer sandwiched therebetween.

3 Claims, 14 Drawing Sheets

U.S. PATENT DOCUMENTS

| | | | |
|---|---|---|---|
| 5,515,461 A | 5/1996 | Deri et al. | |
| 5,528,402 A | 6/1996 | Parker | |
| 5,724,165 A | 3/1998 | Wu | |
| 5,726,805 A | 3/1998 | Kauskik | |
| 5,727,109 A | 3/1998 | Pan | |
| 5,739,888 A * | 4/1998 | Ogura et al. | 349/153 |
| 5,781,258 A * | 7/1998 | Dabral et al. | 349/73 |
| 5,859,728 A | 1/1999 | Colin | |
| 5,877,876 A | 3/1999 | Birdwell | |
| 5,953,087 A | 9/1999 | Hoyt | |
| 5,963,289 A | 10/1999 | Stefanov et al. | |
| 5,963,291 A | 10/1999 | Wu | |
| 6,075,512 A | 6/2000 | Patel | |
| 6,094,246 A | 7/2000 | Wong | |
| 6,104,466 A | 8/2000 | Buchwalter et al. | |
| 6,141,076 A | 10/2000 | Liu | |
| 6,141,361 A | 10/2000 | Mears | |
| 6,151,092 A | 11/2000 | Fujimura | |
| 6,166,838 A | 12/2000 | Liu | |
| 6,181,846 B1 | 1/2001 | Pan | |
| 6,190,774 B1 | 2/2001 | Tanaka | |
| 6,201,593 B1 | 3/2001 | Wong | |
| 6,215,928 B1 | 4/2001 | Friesem | |
| 6,253,015 B1 | 6/2001 | Ukrainczyk | |
| 6,285,478 B1 | 9/2001 | Liu | |
| 6,285,500 B1 | 9/2001 | Ranalli et al. | |
| 6,323,974 B1 | 11/2001 | Harris et al. | |
| 6,353,467 B1 | 3/2002 | Wong | |
| 6,356,389 B1 | 3/2002 | Nilsen | |
| 6,384,882 B1 | 5/2002 | Nagayama et al. | |
| 6,385,217 B1 | 5/2002 | Singh et al. | |
| 6,388,730 B1 | 5/2002 | Lindquist | |
| 6,404,538 B1 | 6/2002 | Chen | |
| 6,417,948 B1 | 7/2002 | Chowdhury et al. | |
| 6,426,816 B1 | 7/2002 | Wu | |
| 6,429,962 B1 | 8/2002 | Xu | |
| 6,455,841 B2 | 9/2002 | Zhou | |
| 6,462,803 B2 * | 10/2002 | Kumagai et al. | 349/153 |
| 6,498,680 B1 | 12/2002 | Zhou | |
| 6,515,751 B1 | 2/2003 | Craighead et al. | |
| 6,519,022 B1 | 2/2003 | Xu | |
| 6,603,781 B1 | 8/2003 | Stinson | |
| 6,621,580 B2 | 9/2003 | Myatt | |
| 6,705,584 B2 | 3/2004 | Hiroshima et al. | |
| 6,845,108 B1 | 1/2005 | Liu et al. | |
| 6,864,943 B2 * | 3/2005 | Hirakata et al. | 349/153 |
| 6,897,917 B2 * | 5/2005 | Cavanaugh et al. | 349/96 |
| 7,046,326 B2 * | 5/2006 | Austin et al. | 349/155 |
| 2001/0043297 A1 | 11/2001 | Arai | |
| 2002/0030783 A1 | 3/2002 | Taniguchi | |
| 2002/0126386 A1 | 9/2002 | Jordan et al. | |
| 2002/0167634 A1 * | 11/2002 | Watanabe et al. | 349/153 |
| 2003/0021304 A1 | 1/2003 | Pezeshki et al. | |
| 2003/0026302 A1 | 2/2003 | Anthon et al. | |
| 2003/0035119 A1 | 2/2003 | Myatt et al. | |
| 2003/0063632 A1 | 4/2003 | Cruz et al. | |
| 2003/0081309 A1 | 5/2003 | Nishi et al. | |
| 2003/0081637 A1 | 5/2003 | Short | |
| 2003/0086452 A1 | 5/2003 | Short | |
| 2003/0090806 A1 | 5/2003 | Chen et al. | |
| 2003/0090808 A1 | 5/2003 | Oike et al. | |
| 2003/0107746 A1 | 6/2003 | Hedin et al. | |
| 2003/0112837 A1 | 6/2003 | Vakhshoori et al. | |
| 2003/0123131 A1 | 7/2003 | Boggy et al. | |
| 2003/0169789 A1 | 9/2003 | Yoon | |
| 2003/0173505 A1 | 9/2003 | Wipiejewski | |
| 2003/0174331 A1 | 9/2003 | Chen et al. | |
| 2003/0201966 A1 | 10/2003 | Pan | |

FOREIGN PATENT DOCUMENTS

| | | |
|---|---|---|
| JP | 63-137212 A | 6/1988 |
| WO | WO-02/14909 A2 | 2/2002 |

OTHER PUBLICATIONS

Del Villar et al. (2003). "Analysis of one-dimensional photonic band gap structures with a liquid crystal defect towards development of fiber-optic tunable wavelength filters," *Optics Express* 11(5):430-436.

Hirai et al. (2003). "Fine pattern fabrication on glass surface by imprint lithography," *Microelectronic Engineering* 67-68: 237-244.

Park and Kostel. (2002). "Nano-Optics Redefine Rules for Optical Processing," *Communication Systems Design* Aug. 2002: 23-26.

Sharon et al. (1997). "Resonant grating-waveguide structures for visible and near-infrared radiation," *Journal of the Optical Society of America* 14(11): 2985-2993.

Wang et al. (2003). "MF28: Electrically Tunable Free-Space Sub-Wavelength Grating Filters with 30nm Tuning Range," *OFC 2003*: 1: 31-32.

Wang et al. (2003). "Design and Realization of Multi-layer Integrated Nano-Optic Devices," *NFOEC Technical Proceedings* Sep. 7, 2003: 148-156.

Wang, Jian Jim. (2002). "Subwavelength Optical Elements (SOEs)—A Path to Integrate Optical Components on a Chip," *NFOEC Technical Proceedings*, Sep. 15, 2002: 1144-1152.

* cited by examiner

LIQUID CRYSTAL CELL PLATFORM

FIELD OF INVENTION

This invention relates generally to optical liquid crystal systems. More particularly, it relates to thermally controlled liquid crystal cells created from materials substantially impervious to atmosphere and integrated with sub wavelength optical nanostructures.

BACKGROUND OF THE INVENTION

Optical nanostructures have been the object of scientific investigation for several years but advances in material science and imprint lithography have only recently resulted in their cost effective manufacturing and availability as optical components in industry.

Optical nanostructures derived with feature sizes below the wavelength of light are known to have uniform behavior over a broad wavelength, wide acceptance angles and unique optical properties as a function of varying dimensions of their underlying grating features. The physical interaction of light with the nanostructure obeys the application of physics of diffraction gratings, but the scale of the structure causes changes in the boundary effects. As a result, quantum effects influence the classical optical effects of reflection, refraction and diffraction, resulting in nanostructure's unique optical properties. Recently, a nanostructure has been created to function as a polarizing beam splitter that performs as a perfect mirror for incident light with the light polarized parallel to the nanostructure and a perfect window with light polarized perpendicular to the nanostructure. By comparison to traditional optics, the aforementioned nanostructured polarizing beam splitter has been demonstrated to perform with 180 degrees of beam separation in a package size under one millimeter versus two degrees of separation for a 15 millimeter length of birefringent crystal. Generally, nanostructures exhibit such unique optical properties as a result of having feature sizes in the hundreds of nanometers to tens of nanometers, below the wavelength of incident light, eliminating all high-order diffractive modes and operating exclusively on zero-order diffraction properties.

As a result of thier low cost of manufacturing, unique optical properties, high performance and miniature form factor, optical nanostructures represent a promising new technology that will have broad ramifications to tomorrow's optical systems.

Realizing the performance and value of optical nanostructures is tantamount to overcoming the primary challenge of integrating these optical structures into other optical elements. Nanostructures may be heterogeneously or monolithically integrated with other optical elements, integrated as thin-films placed adjacent to, affixed to, or inserted into other optical components such as lasers, planar lightwave circuits and liquid crystal devices. The challenge of integrating nanostructures with other optical elements and obtaining the extraordinary performance and scale benefits is a serious undertaking given that the integrated structure will carry a performance metric based on the additive sum optical properties of the two individual structures plus any distortion caused by the interface of the nanostructure and optical element. As a result, the performance of integrated structures usually do not offer the same level of high performance provided by the nanostructure alone. There is a strong need, therefore, to increase the performance of the underlying optical elements targeted for integration with sub wavelength optical elements.

Liquid crystal technology is known to be dynamically controlled and configured to enable a range of optical switching and signal conditioning applications. Formed with opposing plates of sealed glass, liquid crystal cells are considered a prospect technology and integration target capable of supplying the active layer to a nanostructure integrated therewith. Wang et. Al has recently demonstrated an experimental electrically tunable filter based on a waveguide resonant sub-wavelength nanostructure-grating filter incorporating a tuning mechanism in a thin liquid crystal. The device experiment was functional and exhibited performance of 30 nanometer tuning.

It is generally known that the performance of liquid crystal technology is susceptible to temperature and humidity change, and that high humidity and temperature changes cause decreased optical performance, resulting in high insertion loss and low extinction, two critical measures of a cell's performance.

The speed performance and optical characteristics of the liquid crystal medium as a function of applied electric field varies with temperature. In a liquid crystal cell relatively modest changes in temperature can result in relatively large changes in the transmission of light, index of refraction, and the speed of the liquid crystal state changes. FIG. 1 shows the temperature influence of a liquid crystal cell index of refraction across voltage. FIG. 2 shows that voltage for a selected transmission of light in one temperature range will provide a different transmission of light at different temperatures. FIG. 3 shows the relationship between temperature and the amount of time it takes a liquid crystal cell to change states, which decreases with increased temperature. FIG. 3 also shows that switching times of liquid crystal cells are sensitive to cell gap thickness. The series represented in the figure are two cells each having different gap sizes. More specifically, the faster switching cell has a cell gap 0.4 micron larger than the slower cell. Clearly, size and the effect of the change in optical properties are factors in controlling the optical performance in the various states of the liquid crystal cell across temperature.

In order to ensure that the temperature of the liquid crystal medium can provide stable operation and within a practical response time, prior art liquid crystal cells are known to utilize active thermal management systems based on independent temperature sensor and heater elements. JACKSON et al. relies on a resistive heating element that can be energized to heat the liquid crystal cell whenever the temperature of the cell drops below a predetermined temperature trip point. JACKSON does not accommodate feedback to the voltage control of the cell and fails to handle ambient temperature increases above the trip point. McCartney et al. provides a more complete solution that incorporates the output of the temperature sensor into a temperature feedback loop to adjust voltage in response to temperature change. In this design, a two-dimensional lookup table provides the output voltage for any temperature and pixel attribute combination. McCartney's design, however, does not scale to high resolution optical systems without increasing the size of the lookup table.

In general, the prior art liquid crystal thermal management systems rely on use of individual discreet devices for heating and sensing the liquid crystal cell. These devices are generally affixed to the outside glass of the cell at disparate locations so they are generally incapable of functioning uniformly across the cell. In addition, because these devices are usually affixed to the outside glass, all heating and sensing functions directed to the liquid crystal molecules on the inside of the glass must be translated through the glass medium. This can result in hysterises and other effects that distort the effectiveness of closed loop temperature sensing and heating systems. Finally, prior-art liquid crystal cell heaters and temperature sensors are typically attached to the cell using epoxy resins, and epoxy resins are generally known to absorb moisture in high temperatures and high humididty conditions, which leads to degradation or inconsistancy in cell performance.

The performance of liquid crystal cells are generally very sensitive to moisture and humidity. Prior art liquid crystal seals are known to provide varying levels of protection of liquid crystal cells from moisture and humidity. The prior art designs generally seal and space the cell with glass beads, frit and organic polymers such as epoxy resin. Sealing materials are generally disposed, in the form of gaskets, about the periphery of the cell. The advantage of a seal of glass frit is known to be that such seal is practically impervious to gas and vapors, but this approach requires formation by high temperature processing, and high temperature processing tends to distort the substrate and render difficult control uniformity of the distance between the inner surface of the parallel substrates. This gap (containing the liquid crystal material) must be maintained with a high degree of uniformity to achieve precise operation of a liquid crystal cell. Accurately controlling the liquid crystal cell gap is keystone to enabling high performance nanostructured liquid crystal optical systems of the present invention.

In producing an effective glass frit seal, the frit is generally applied to a surface of one of the substrates as a paste of glass powder particles dispersed in a liquid vehicle. The substrate is subsequently heated over a programmed temperature regime wherein, at lower temperatures, the solvent is evaporated and the binder is burned off, and hence in the higher temperature portions of the regime, the glass powder itself melts and coalesces to form a strongly adhesive bond to the glass substrate. Subsequently, the second glass substrate is positioned over the coalesced frit and the entire assembly is again subjected to a programmed temperature regime during which the temperature is raised within a few tens of degrees of the glazing temperature of the glass frit. At this relatively high temperature, the glass frit wets the second substrate to acquire satisfactory adhesion thereto. It is known that this second heating cycle tends to soften the substrates and cause warpage thereof, with the result that cells, particularly those of larger surface area, sealed by this glass frit method tend to have a very low percentage of acceptable manufacture.

It is generally known that warpage during fabrication can be prevented by the alternate use of organic polymer sealants, such as epoxy resins and the like, which can be processed at much lower temperatures. Polymer sealants may be screen printed from a solution or dispersion of the polymer in a solvent, or a polymer sheet can be cut into the shape of a gasket which is sandwiched between the substrates to be sealed, and the sandwich is subsequently heated to effect such seal. It is also known to introduce the polymer along the edges of an assembly of two substrates which are kept otherwise separated by interior spacers. However, such organic polymer sealants have a relatively high permeability to water vapor. Under high temperature and humidity conditions, water vapor permeates into the seal causing the expansion of the seal and a shape change in the liquid crystal cavity that results in a change in the known performance of the liquid crystal cell.

FEATURES OF THE INVENTION

The present invention contain several features that may be configured independently or in combination with other features of the present invention, depending on the application and operating configurations. The delineation of such features is not meant to limit the scope of the invention but merely to outline certain specific features as they relate to the present invention.

It is a feature of the present invention to provide a liquid crystal cell that may be formed of glass etched with sub wavelength optical features.

It is a feature of the present invention to provide a liquid crystal cell that may be fabricated with an integrated sub wavelength optical nanostructure.

It is a feature of the present invention to provide a liquid crystal cell that may be fabricated with an integrated optical element.

It is a feature of the present invention to provide a liquid crystal cell that may be fabricated with an integrated polarizer, beam splitter, polarization beam splitter, waveguide, thin film, filter, mirror, photodetector, isolator, grating, subwavelength grating, combiner, waveplate, nanostructure, or some combination thereof.

It is a feature of the present invention to provide a liquid crystal cell platform that can be configured in various applications, including but not limited to telecommunications applications in optical switching, variable optical attenuation, tunable filters and wavelength selection applications.

It is a feature of the present invention to provide a liquid crystal cell that may be constructed from materials substantially impervious to moisture.

It is a feature of the present invention to provide a liquid crystal cell that may contain a heater and temperature sensor integrated therein as single physical element and to provide for accurate control of heating and temperature sensing.

It is a feature of the present invention to provide a novel method of operating a liquid crystal cell across a range of temperature without the need for lookup tables otherwise used to compensate for real time temperature changes.

It is a feature of the present invention to provide a liquid crystal cell that passes the strict telecommunications guidelines as outlined in Telcordia GR1221 without the need for hermetic housing.

It is a feature of the present invention to provide an optically flat liquid crystal cell and not otherwise prone to warpage during fabrication process.

It is a feature of the present invention to provide an optically flat liquid crystal cell and not otherwise prone to warpage when exposed to various thermal and humidity atmospheres.

It is a feature of the present invention to provide a liquid crystal cell whose thickness may be controlled at nanometer resolution.

It is a feature of the present invention to provide a novel method for fabricating a liquid crystal cell having some or all of the features included therein.

It is a feature of the present invention to provide a novel method for aligning two substrates, including but not limited to those substrates of the present invention.

It is a feature of the present invention to provide a platform that may be used in transmissive or reflective liquid crystal cells.

It is a feature of the present invention to provide a platform that may be configured into an array of liquid crystal cells.

SUMMARY OF THE INVENTION

The disadvantages associated with the prior art may be overcome by a liquid crystal cell and fabrication method directed to a deposited metal gasket moisture barrier bonding two opposing plates of glass each having a spacer layer to accurately control cell gap thickness. The liquid crystal cell may include an integrated thermal sensor and heater deposition layer sandwiched between or deposited on at least one or both opposing plates of glass.

The disadvantages associated with the prior art may further be overcome with a liquid crystal cell control system utilizing a time division scheme that multiplexes temperature sensing and heating functions across an integrated active thermal element such that the cell may generally be kept at a constant temperature. A calibration process characterizes the profile of the cell and generates a polynomial regression formula that provides the voltage drive output for a temperature and cell state input. The control system stores the state of the liquid crystal cell, the regression formula, and reads the temperature of the liquid crystal cell to compute and assert the temperature compensated voltage drive.

DETAILED DESCRIPTION

Throughout this application, like reference numbers as used to refer to like elements. For instance, the two substrates used to form the liquid crystal cell of the present invention are referred to throughout this applications as 110A and 110B. Those supporting elements and features of the invention that are distributed on each substrate and later combined may be referred to under their index reference for a particular substrate 'A, 'B or for simplicity sake, under the shared reference '.

Figure 1:
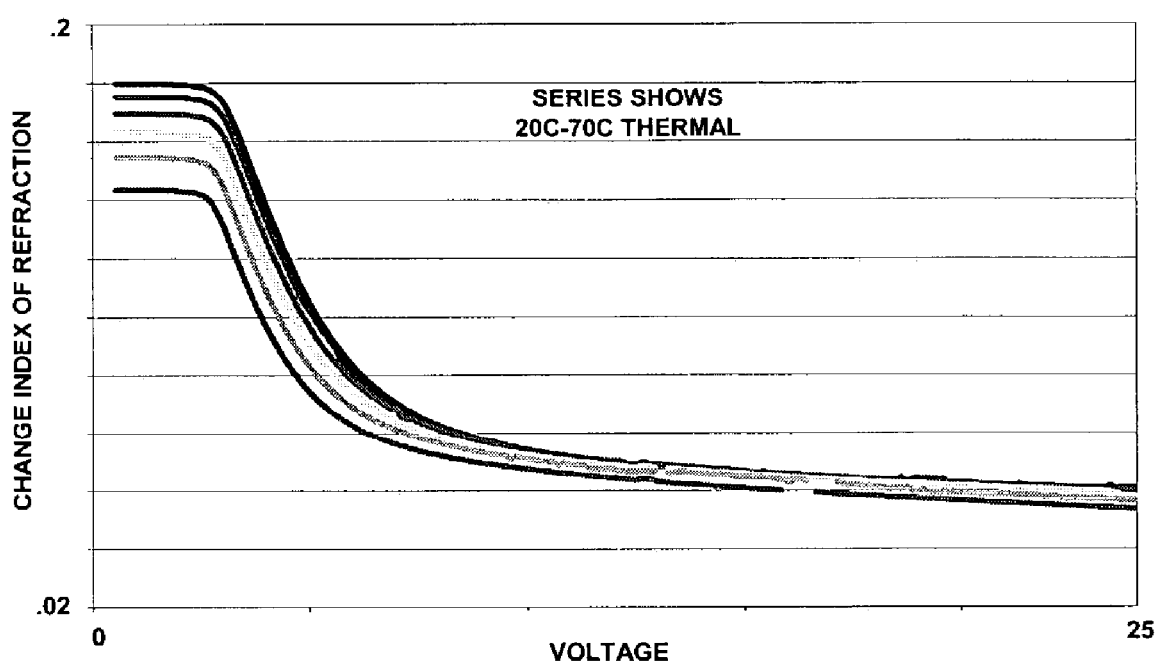
FIG. 1 shows one example liquid crystal cell's temperature dependence and change in index of refraction.
Figure 2:
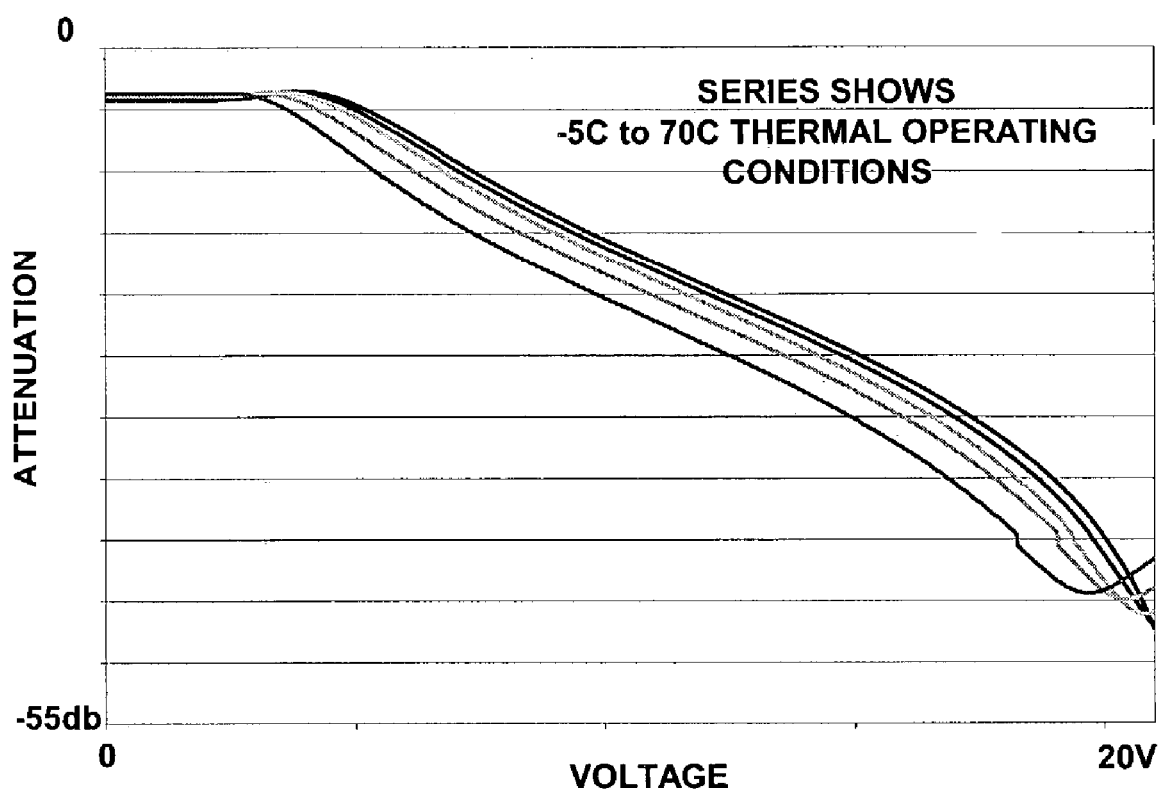
FIG. 2 shows one example liquid crystal cell temperature dependence of the attenuation function.
Figure 3:
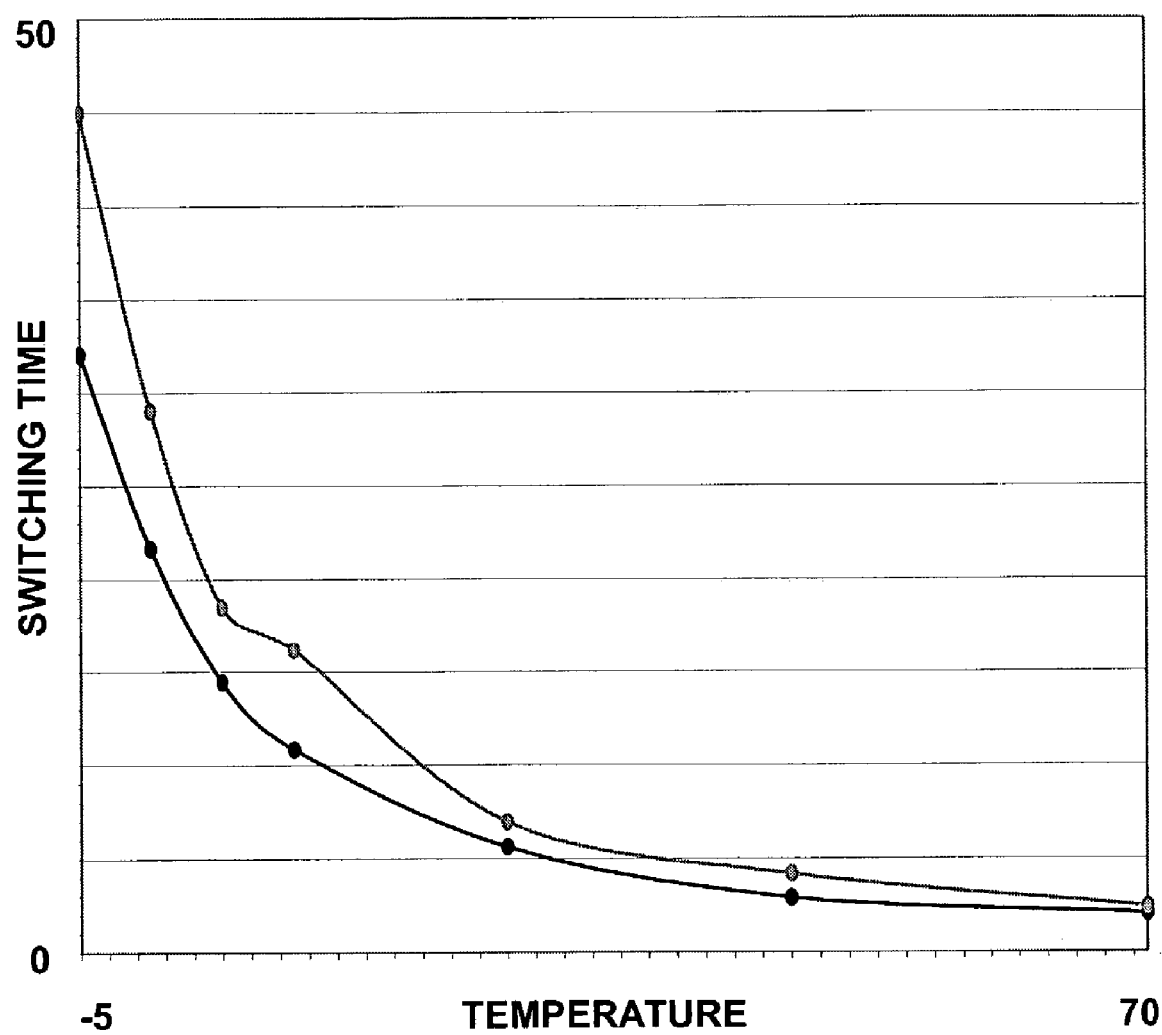
FIG. 3 shows how liquid crystal cell shutter switching speeds change as a function of temperature and cell gap thickness.
Figure 4A:
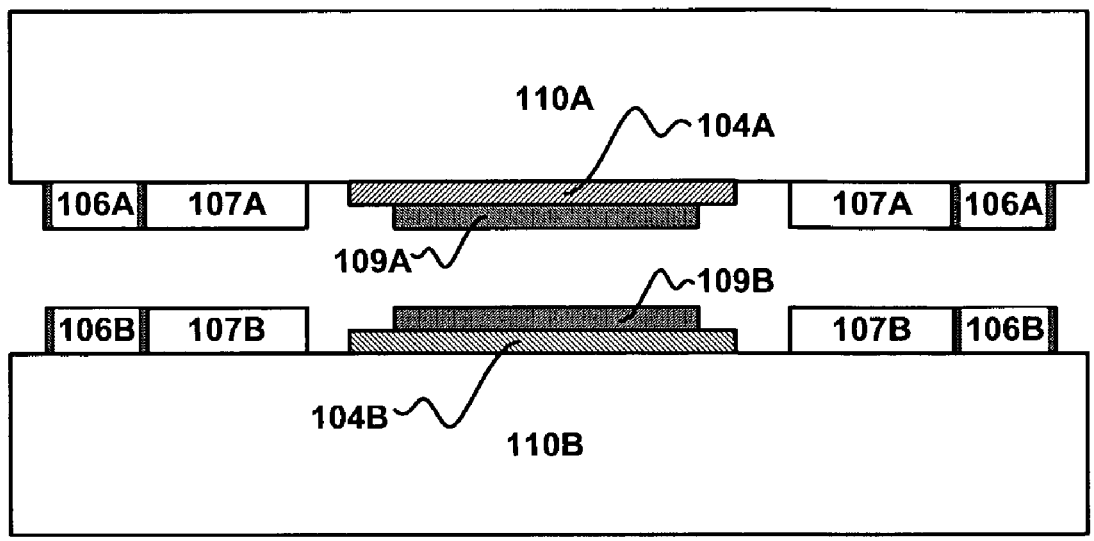
FIGS. 4A-4D shows various liquid crystal cell embodiments of the present invention.

A first embodiment of the present invention is presented in FIG. 4A, which shows (not to scale) a liquid crystal cell platform 100 having a first substrate 110A in opposition to a second substrate 110B. In this embodiment, the first substrate may contain an inner surface having a transparent conductive electrode layer 104A, liquid crystal alignment layer 109A, a metal gasket element layer 106A and spacer element layer 107A. The second substrate 110B contains an inner surface having an a transparent conductive electrode layer 104B, a liquid crystal alignment layer 104B, metal gasket element layer 106B and spacer element layer 107B.

Figure 4B:
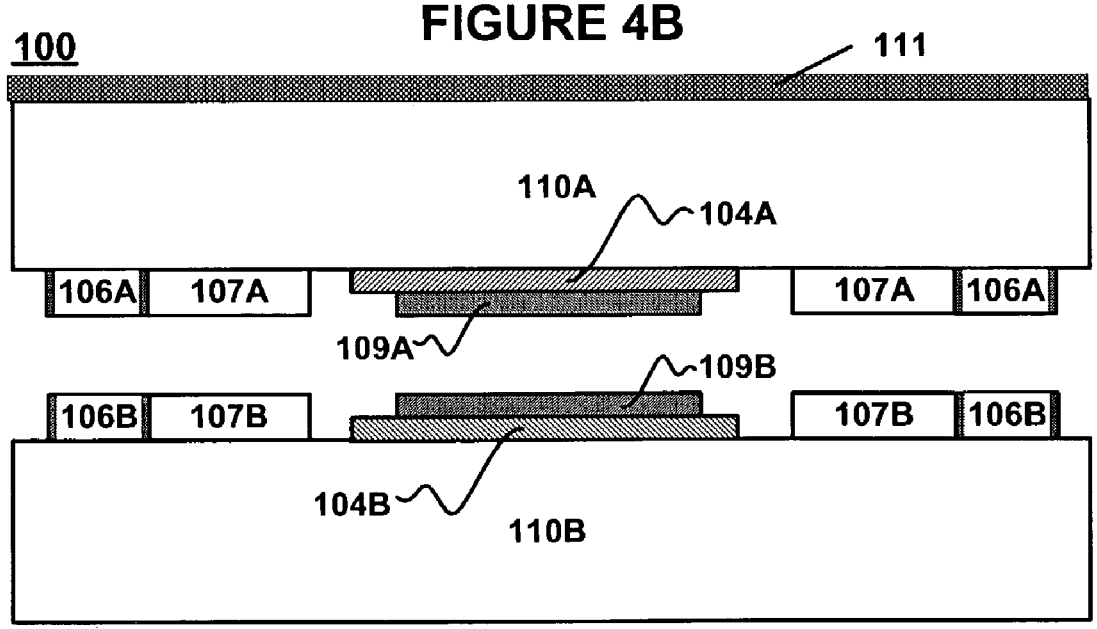

A second embodiment of the present invention includes an integrated optical element 111 and is presented in FIG. 4B, which shows (not to scale) a liquid crystal cell platform 100 having a first glass substrate 110A in opposition to a second glass substrate 110B wherein the first substrate contains an integrated optical element 111 on one side of the substrate, a transparent conductive electrode layer 104A, a liquid crystal alignment layer 109A, metal gasket element layer 106A and spacer element layer 107A on the opposing side, and, the second substrate 110B containing a transparent conductive electrode layer 104B, a liquid crystal alignment layer 109B, metal gasket element layer 106B and a spacer element layer 107B.

Figure 4C:
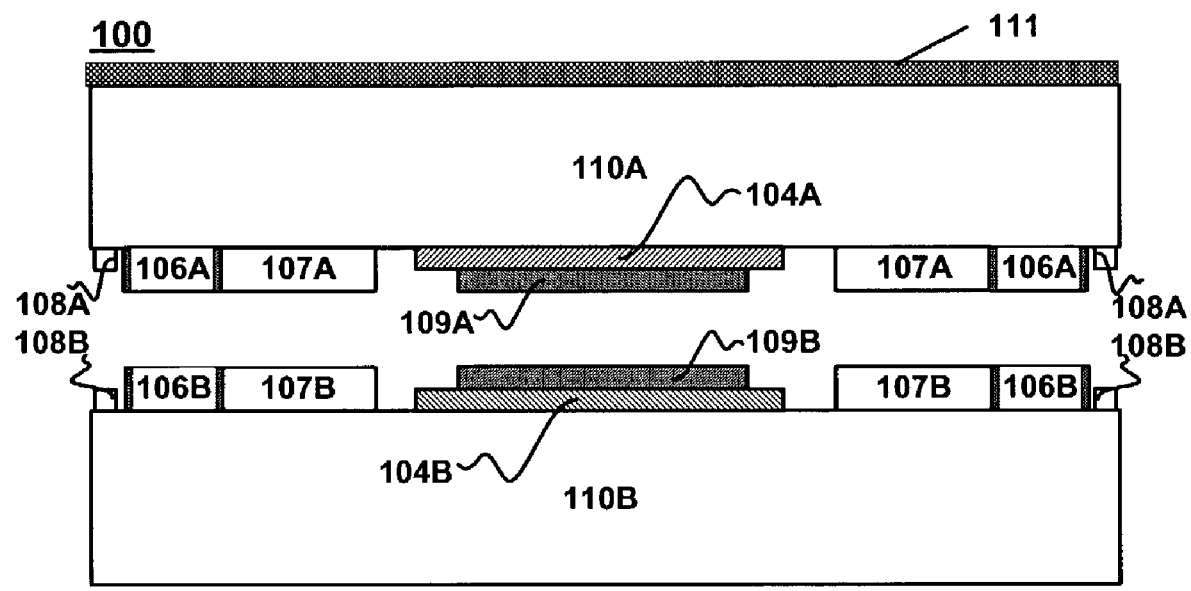

A third embodiment of the present invention is presented in FIG. 4C, which shows a liquid crystal cell platform 100 having a first glass substrate 110A in opposition to a second glass substrate 110B wherein the first substrate contains an integrated optical element 111, a transparent conductive electrode layer 104A, a liquid crystal alignment layer 109A, a metal gasket element layer 106A, a spacer element layer 107A and an integrated heater/temperature sensor element layer 108A. In this embodiment, the second substrate 110B contains a transparent conductive electrode layer 104B, a liquid crystal alignment layer 104B, metal gasket element layer 106B, a spacer element layer 107B, and an integrated active thermal element, heater/temperature sensor layer 108B.

Figure 4D:
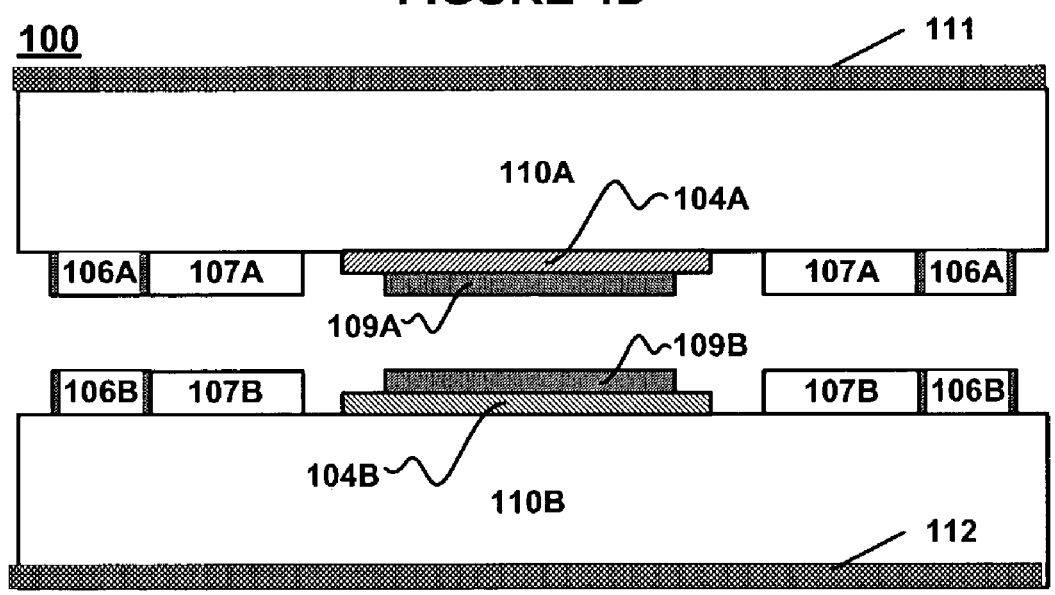

A fourth embodiment of the present invention is presented in FIG. 4D, which shows a liquid crystal cell platform 100 having a first glass substrate 111A in opposition to a second glass substrate 110B wherein the first substrate contains an integrated optical element 111, a transparent conductive electrode layer 104A, a liquid crystal alignment layer 109A, a metal gasket element layer 106A, and a spacer element layer 107A. In this embodiment, the second substrate 110B contains an integrated optical element 112, transparent conductive electrode layer 104B, a liquid crystal alignment layer 104B, metal gasket element layer 106B, and a spacer element layer 107B. In this embodiment, the integrated optical elements 111 and 112 may provide the same or different functionality, depending on the application. For example, in a free space variable optical attenuator application, a transmissive cell 100 might be configured with two polarizers transmitting perpendicular states of light, 111, 112, respectively. In an optical switching application, a reflective cell 100 may include an optical element 111 functioning as a polarization beam splitter and combiner, and optical element 112 functioning as a mirror.

With respect to all embodiments, it is generally preferable that substrate 110 be comprised of glass but other substrate materials, including silicon, polymers, etc., may be suitable depending on the application.

Figure 5:
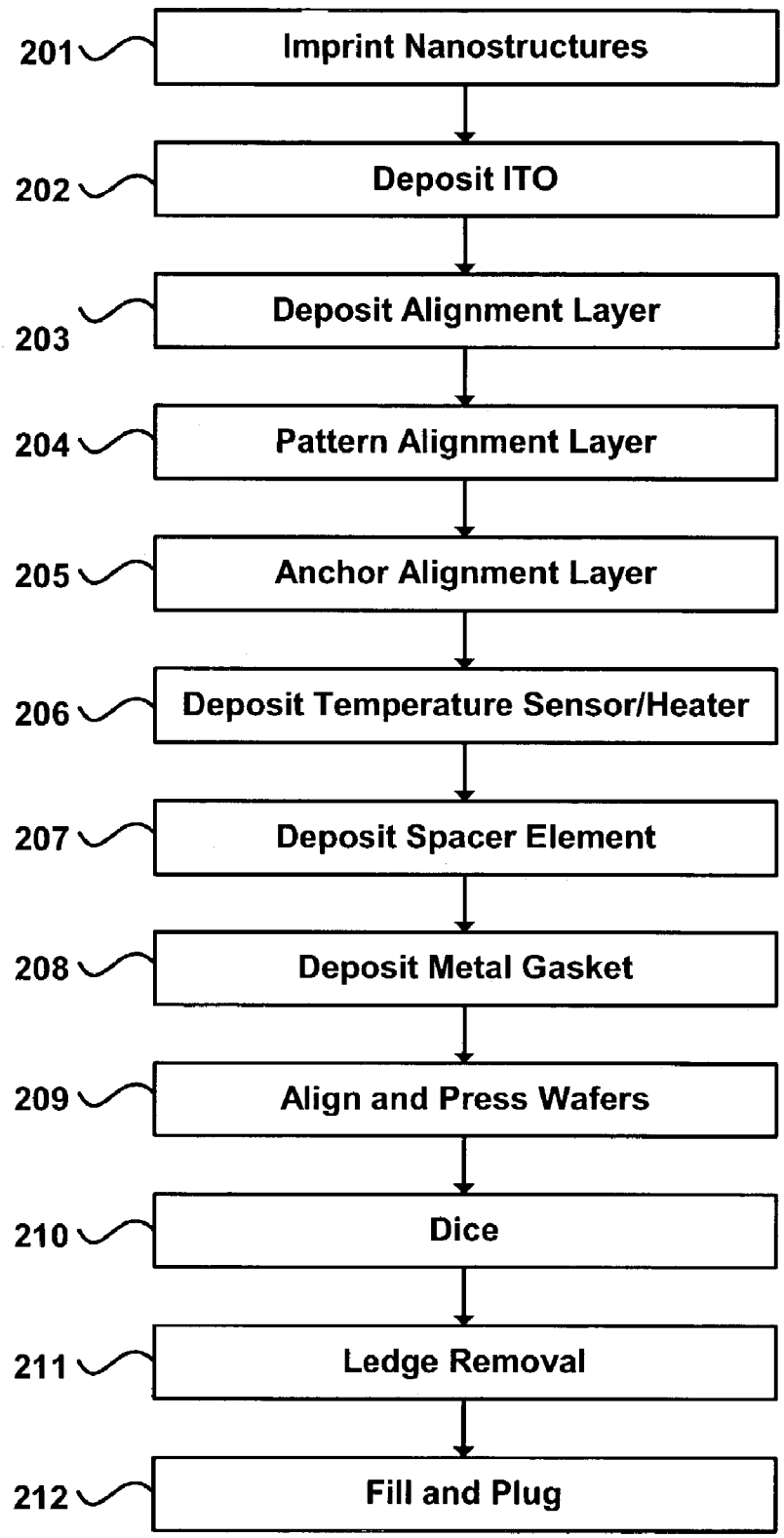
FIG. 5 shows one process flow for fabricating the liquid crystal cells of the present invention.

FIG. 5 shows one example fabrication process to create the liquid crystal cell platform 100. Various optional steps may be omitted depending on the embodiment of configured features.

With respect to FIG. 5, optional step one involves integrating an optical element into at least one substrate. The optical element may function as a polarizer, beam splitter, filter, thin film, polarization beam splitter, waveguide, waveplate, combiner, mirror, partially tranparent mirror, isolator, detector, grating, subwavelength grating, nanostructure, or some combination thereof and including those optical functions presently known in the art. Preferably, the optical element is a nanostructured grating feature, such as those described by NanoOpto Corporation of New Jersey. The grating feature may be applied to or integrated onto substrate 110A or 110B, or onto both substrates depending on the application. With respect to process step 201, a glass substrate is etched using nanoimprint lithography or similar methods known in the field based on impressing a reference mask into photo resist to create surface relief patterns on the substrate where the surface relief photo resist pattern is etched to form grating features in the nanometer range. Alternately, the optical element may be supplied as a thin film and bonded to the target substrate by way of epoxy or other methods described herein or otherwise generally known. The optical element may also be deposited directly on the inner or outer surface of either substrate, or both. Finally, the optical element itself may be integrated into the substrate by way of choice of substrate material. For example, the substrate 110A, 110B or both substrates may be made of Polarcor, a polarization beam splitter glass made by Corning, Inc.

Figure 6A:
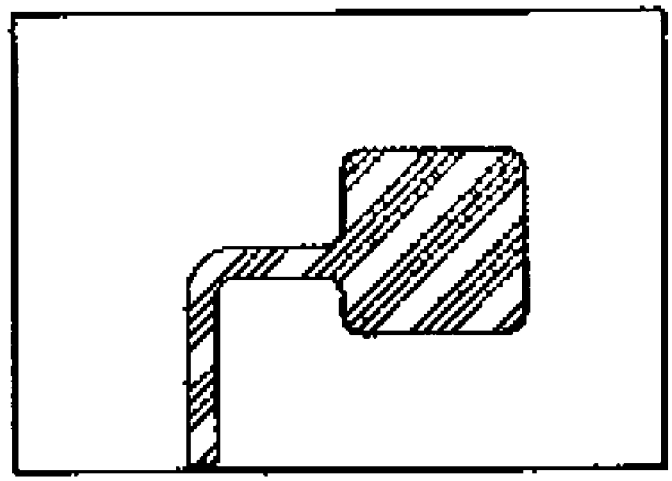
FIGS. 6A and 6B show example indium tin oxide (ITO) electrode forming masks of the present invention.
Figure 6B:
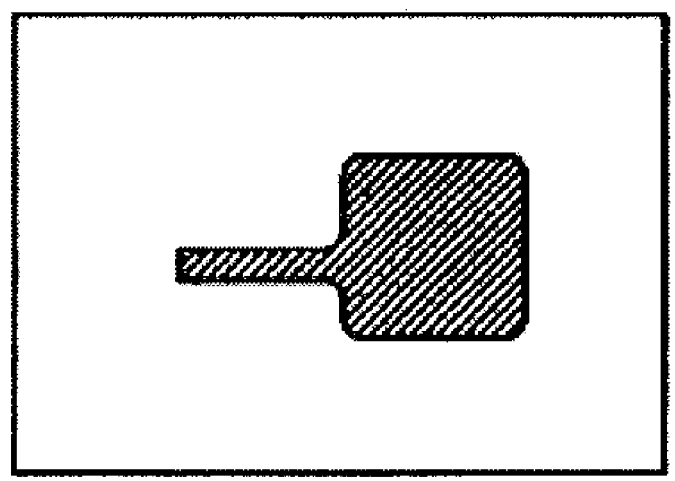

Step two involves adding the appropriate ITO patterns to the first and second glass substrates to form the liquid crystal electrodes. With respect to process flow 202 of FIG. 5, a standard PECVD process may be used to apply thin film of ITO approximately 100 angstroms thick. FIGS. 6A and 6B show example ITO masks that may be used to pattern substrates 110A and 110B, respectively.

Step three involves adding polyimide alignment layer to the first and second glass substrates. With respect to process flow 203 of FIG. 5, standard spin coating stepped processes may be used at room temperature to create a layer of polyimide approximately 600 angstroms thick on each substrate.

Step four involves patterning the polyimide layer. With respect to process 204, photo resist may first be applied to the substrates and masked using traditional photolithography techniques or laser etching may be used to pattern the substrates. Wet or dry etching performed thereafter may result in a pattern of polyimide.

Step five involves anchoring the liquid crystal alignment layers. With respect to process step 205, one traditional method is to rub the polyimide of each substrate to form the alignment layers. In a twisted nematic configuration, the rubbing direction of the first substrate may be orthogonal to the rubbing direction of the second substrate. In an electronically conductive birefringence (ECB) configuration, the rubbing direction of the first substrate may be parallel to the rubbing direction of the second substrate. Various anchoring schemes may be define rub angles other than 0 or 90 degrees. An alternate method of forming the alignment layers is to employ an imprint lithography technique where a reference mask is pressed onto a deposited photo resist layer to create surface relief patterns in the photo resist which is subsequently etched to form high precision alignment grooves with nanoscale tolerance.

Figure 7A:
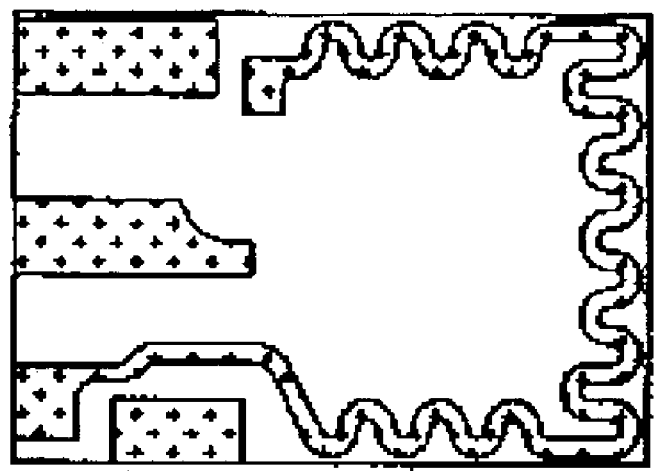
FIGS. 7A and 7B show example integrated active thermal element forming masks of the present invention.
Figure 7B:
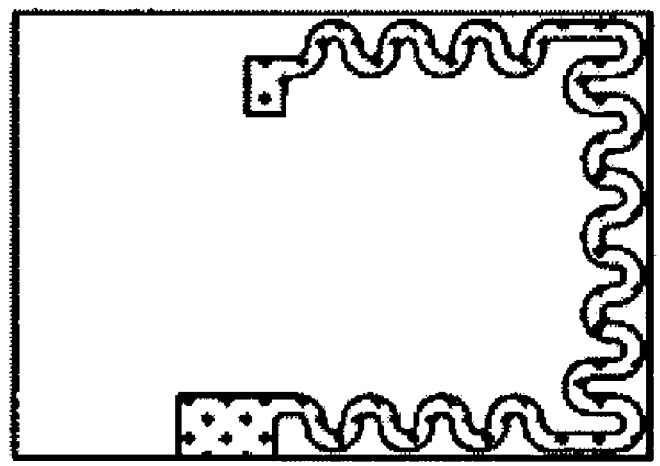

Optional step six involves creating the active thermal element, integrated heater and temperature sensor. FIGS. 7A and 7B show example masks that may be use with respect to process step 206 of FIG. 5, in which a seed adhesion layer of chrome is first deposited approximately 200 angstroms thick onto the substrates, followed by a PECVD deposition thin film platinum resistor layer approximately 2000 angstroms thick and forming the upper and lower portions of the integrated heater/temperature sensor. The upper and lower portions of the integrated device, applied to substrates 110A and 110B, may be separated by an air gap approximately 9.6 microns and interconnected by VIAS formed from a metal deposition step that will be described in succeeding step eight. Again, it need be stated that gap thickness is delineated for example purposes and will change depending on the desired application. It should be stated that, depending on the configuration, the platinum thin film resistor may be patterned in various shapes, including but not limited to arched, curved, circular, zigzag, stripped as well as the serpentine pattern of FIGS. 7A and 7B. Given the resistivity of the thin film platinum, approximately 10.6E-8 ohm meters, the example shown yields approximately 100 ohms resistance at room temperature.

Figure 8A:
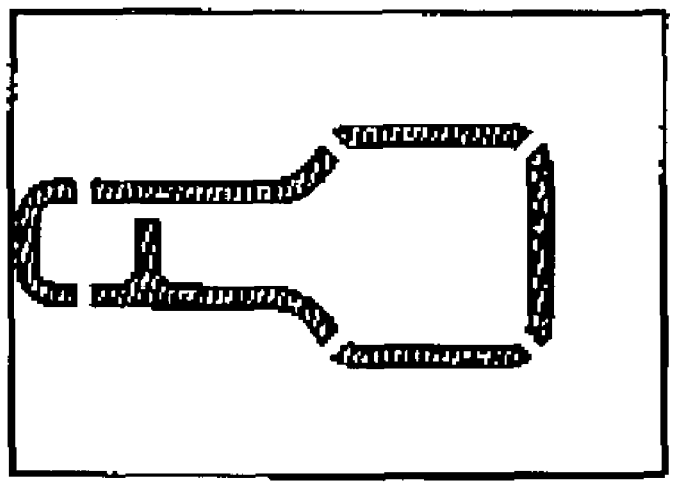
FIGS. 8A and 8B show example spacer element forming masks of the present invention
Figure 8B:
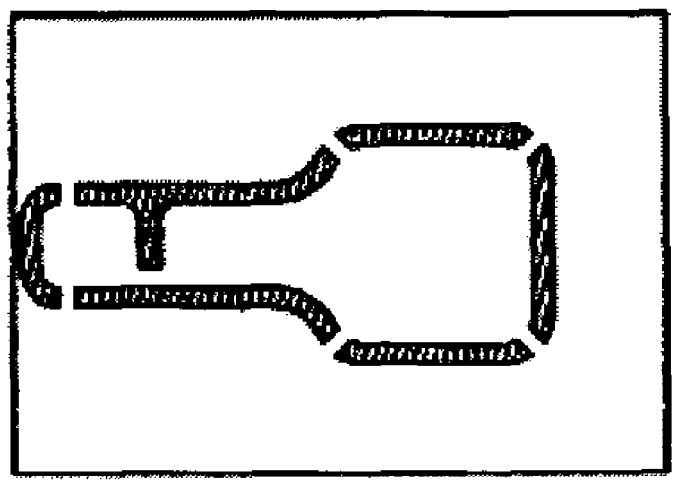

Step seven involves creating the spacer element 107. Spacer element 107 controls the gap thickness of the liquid crystal cell. While it is not necessary to equally distribute the spacer element equally on each substrate, it is preferred that one half of the desire gap thickness of the completed cell shall define the thickness of the spacer element 107 as deposited on each substrate. The combined cell 100 gap thickness may therefore be formed with a tolerance based on deposition process. Silicon dioxide is the preferred material for creating the spacer element, however other materials such as aluminum oxide, silicon nitride, silicon monoxide and other materials compatible with thin film deposition processes that do not substantially compress may also be used as an alternative to the silicon dioxide provided they are compatible with the selected liquid crystal substrate material. FIGS. 8A and 8B show an example mask that may be used to perform the process step 207 of FIG. 5, where a patterned layer of 5 microns thick of silicon dioxide is deposited onto each substrate.

Figure 9A:
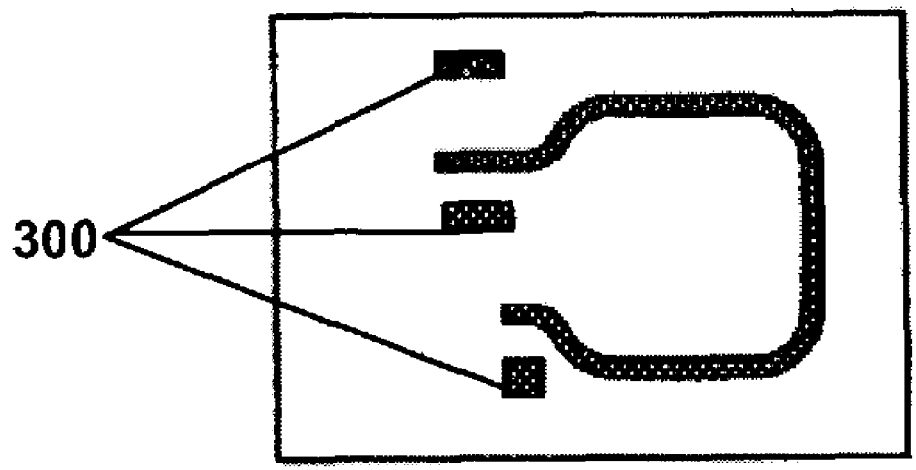
FIGS. 9A and 9B show example masks for defining a metal gasket element layer of the present invention.
Figure 9B:
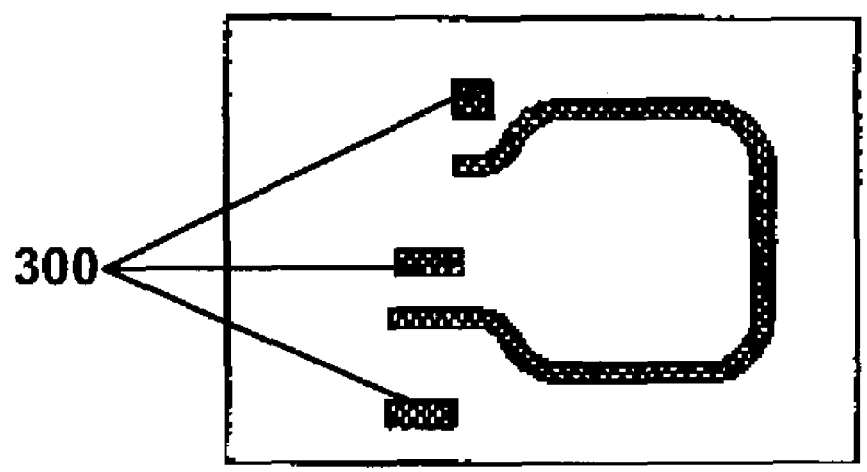

Step eight involves creating the metal gasket element 106. Metal gasket element 108 may be made from a variety of metals, including but not limited to, indium, gold, nickel, tin, chromium, platinum, tungsten, silver, bismuth, germanium and lead. However it is preferable to use indium because of its pliability and relatively low melting temperature. FIGS. 9A and 9B show example masks that may be used to perform process step 208 of FIG. 5, where, for the continuing example purpose, a layer approximately 7 to 9 microns thick of indium may equally be deposited on each substrate. It is generally preferable that metal gasket layer of this process step is deposited thicker than the spacer element of the previous step due to seepage that occurs during the additional processing steps. Metal gasket masks, such as those shown in FIGS. 9A and 9B, may be configured to form referential VIAS 300 that enable electrical interconnection between features deposited on either substrate 110A or 110B. VIAS 300 may also be formed to simplify routing external contact pads to the temperature sensor and heating element. For example the VIAS 300 of the present example are positioned to overlap the heater/temperature sensor platinum layer defined in step six. They are also positioned to overlap the ITO layer so as to define contact pads to drive the two electrodes of the liquid crystal cell.

Step 9 involves aligning and pressing wafers 110A together with 110B. It is known that visual alignment reference marks may be etched into the underlying wafer, or that a physical feature of the glass sheet such as an edge or alignment hole may be used to perform wafer alignment.

However, a high yield method of accurately aligning the relative position of the two glass substrates without the need for expensive high precision alignment equipment is hereby presented, in which complimentary interlocking geometric features deposited on each substrate, mate with each other to prevent relative movement of the glass sheets during the bonding and pressing process. Such interlocking features mitigate any non uniformity in the bonding process and given that the typical gap between two glass sheets of a liquid crystal cell is less than 20 micrometers, thin film deposition or screening processes can be used to create precisely controlled and repeatable geometric features. With respect to process step 209 of FIG. 5, the substrates 110A and 110B may be brought together, aligned under pressure at room temperature to form a chemical bond metal gasket at the gap distance defined by the sandwich spacer elements formed from both substrates. Step 10 involves dicing of the wafers. Process step 210 of FIG. 5 may be performed using a dicing saw or via etching techniques.

Figure 10A:
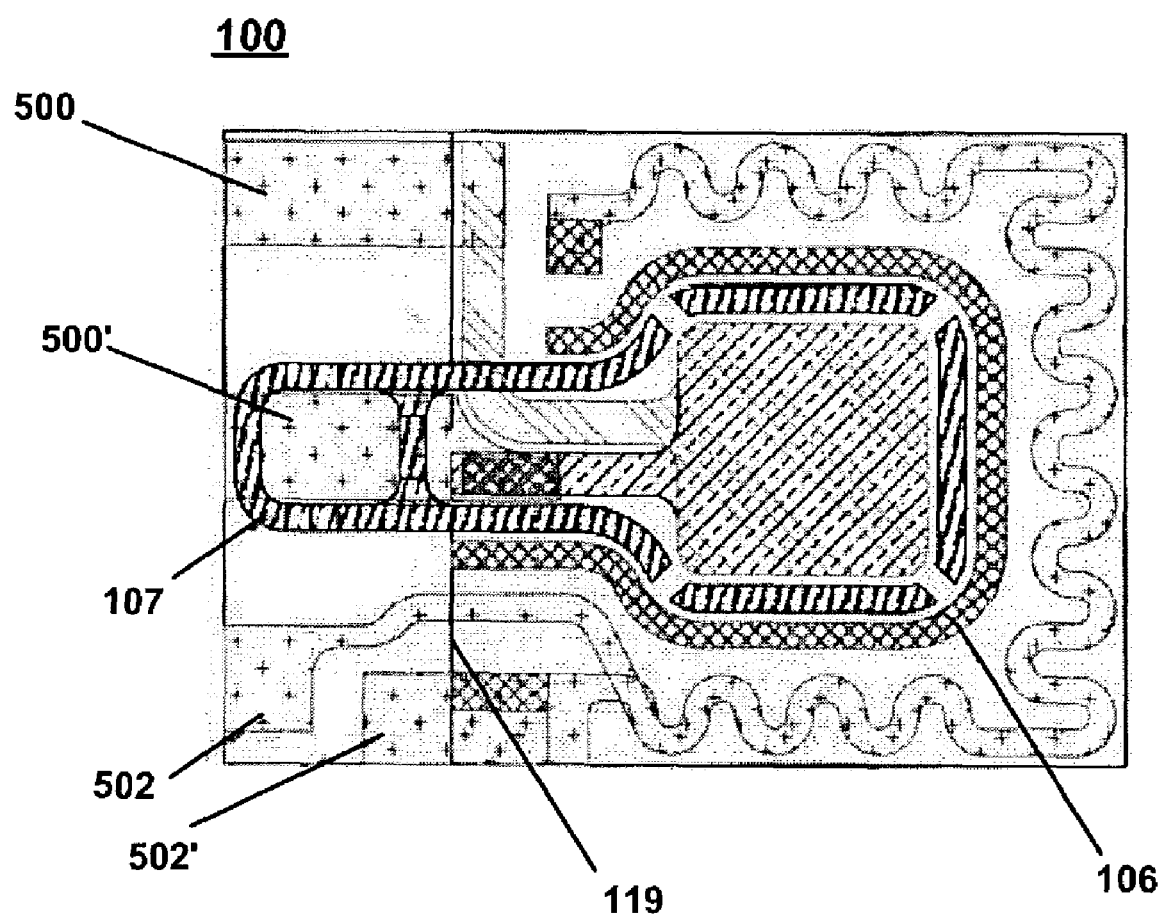
FIG. 10A shows a top view example integrated perspective showing the relationship between various layers of the present invention.

Step 11 involves removal of a portion of protective glass on the liquid crystal cell. FIG. 10A shows a top perspective of the various layers that combine through the substrates when interposed thereupon each other in a fully configured embodiment of the present invention. With respect to process 211 of FIG. 5, the substrate 110B is scored using a diamond dicing saw to cut a trench approximately 90% through the thickness of the substrate and forming the break off line 119 of FIG. 10A. A portion of the substrate 110B is broken off along the break off line 119 to define an access surface 113 of figure 10B that provides access to the underlying liquid crystal electrode contact pads 500 and 500', the underlying liquid crystal heater/temperature sensor element electrical contact pads 502 and 502', as well as to the liquid crystal fill port 115.

Step 12 involves filling the liquid crystal device with a liquid crystal molecules, process 212 of FIG. 5. This step may be performed using traditional methods of filling a liquid crystal cell, whereby the cell is placed in a vacuum, a droplet size of liquid crystal material is placed at the fill port 115, and with the release of the vacuum, equilibrium pressure forces the liquid crystal material into the fill port 115 and the fill port is plugged. Several techniques to cap the fill port, including UV curable epoxy which may be used to close the fill port.

Electronic Control System

Figure 11:
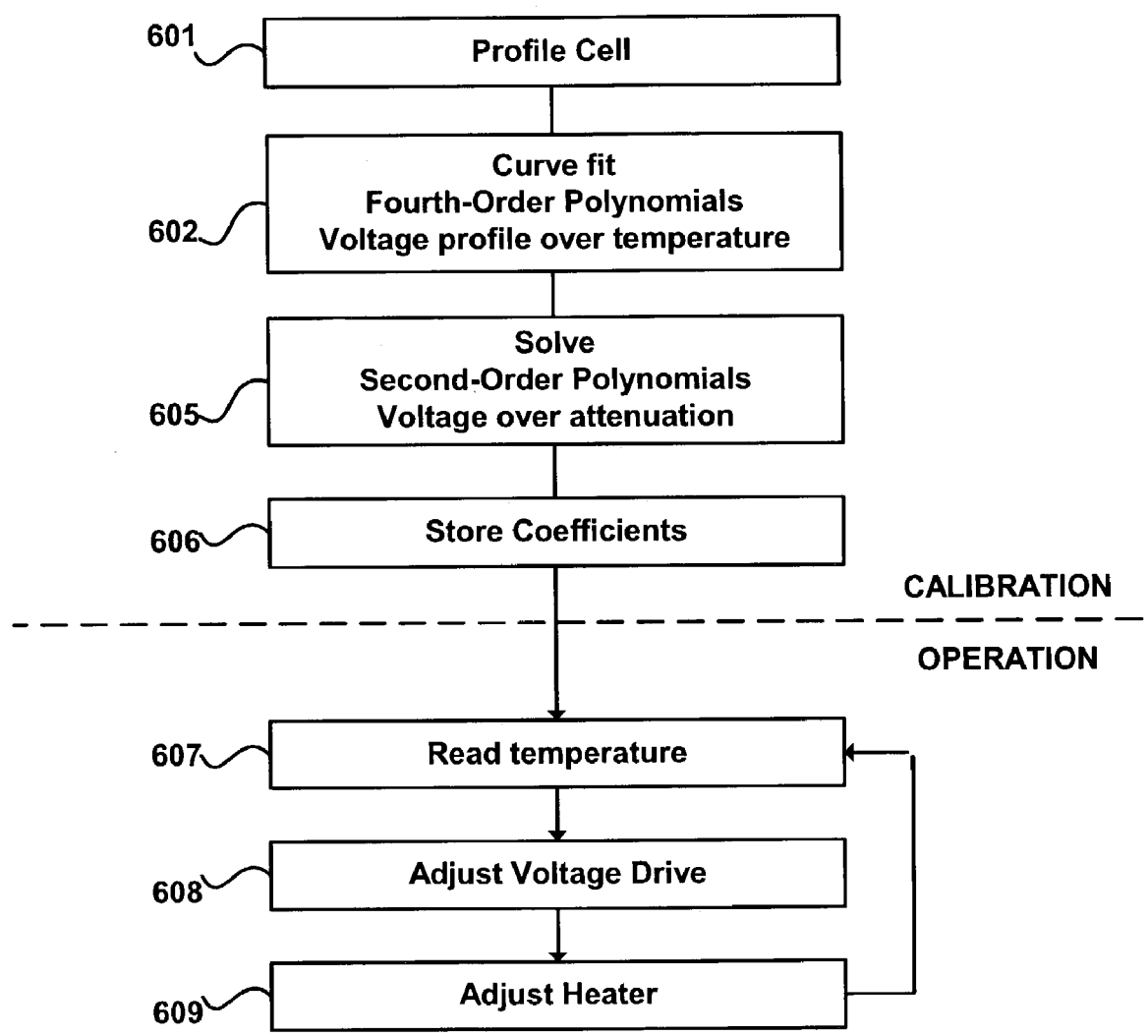
FIG. 11 shows the liquid cyrstal thermal calibration and feedback loop method flows.

A block diagram of components directed to a liquid crystal cell system and its host controller are included in FIG. 11 along with the liquid crystal thermal management and voltage controller subsystems of the present invention, now described in further detail.

In one example configuration, host computer 400 may be configured to communicate with microcontroller 402 over a full duplex data interface and enabling the host computer to engage functions, send commands and retrieve data from microcontroller 402. Microcontroller may be configured to store software control routines. The software control routines may function to adjust voltage drive provided to the liquid crystal cell in response to temperature fluctuations.

The microcontroller may utilize a time division multiplexing scheme that multiplexes temperature sensing and heating functions in the integrated sensor/heater device such that the cell may generally be kept at a constant temperature. A calibration process characterizes the profile of the cell and generates a polynomial regression formula that provides the optimal voltage drive output for given temperature and cell state inputs. The microcontroller 402 stores the state of the liquid crystal cell, the regression formula, and reads the temperature of the liquid crystal cell to compute and assert the temperature compensated voltage drive.

FIG. 11 shows a calibration process that may be used to perform the method of the present invention in which a liquid crystal cell thermal operating characteristic profile is translated into deterministic coefficients assembled into a stored regression formula used to adjust the voltage drive to the cell in response to temperature and cell state.

The first step to determine the coefficient values in the cell's temperature and voltage compensation profile, is to profile the liquid crystal cell drive characteristics across a range of temperatures. The profile process step 601 may examine a light source passing through the cell and its attenuation at a given voltage and temperature combination. An operational liquid crystal cell is placed in a thermal chamber programmed to change operating temperature across the desired temperature range at a given interval. At every temperature change interval, a range of voltages are provided to the liquid crystal cell while a performance characteristic, such as attenuation, is measured. Voltage is scanned until reference attenuation levels are achieved, at which point the voltage, attenuation and temperature levels are stored as a grid reference in a cell profile definition table. The performance of the liquid crystal cell is recorded at grid point attenuation and temperature levels, resulting in a multi dimensional lookup table whereby any temperature and voltage input provides an attenuation level output. This table may be represented as a three dimensional surface.

Step two requires processing the lookup table to smooth the voltage profile over temperature at the given attenuation levels as recorded in the previous step. A statistical program capable of performing regression analysis, such as Mathematica ® may be used to perform this process step 602. The regression software is provided with the look up table generated in step one, and performs a fourth order regression curve fitting process that generates for each attenuation level, the appropriate coefficients a,b,c,d, and e representing a voltage versus temperature profile of the cell at each attenuation level, represented by the following formula, $$v = a + bT + cT^2 + dT^3 + eT^4$$

$$v_1 = a_1 + b_1 T + c_1 T^2 + d_1 T^3 + e_1 T^4$$

$$V_2 = a_2 + b_2 T + c_2 T^2 + d_2 T^3 + e_2 T^4$$

$$V_n = a_n + b_n T + c_n T^2 + d_n T^3 + e_n T^4$$

where V=voltage, T=liquid crystal cell temperature, a,b,c,d,e=curve fit coefficients, and n=attenuation level.

Given that smooth curves result from the prior step that define the optimal voltage drive level for a given temperature at the recorded grid attenuation level, step three results in smooth curve regressions fit across orthogonal axis of the three dimensional surface, whereby the smooth curves are fit over the coarse attenuation grid recorded in step 1. In this process step 603, the five coefficients of the previous step are each solved by a second order regression. Specifically, Mathematica ® or any suitable program is used to solve for the three coefficients that fit the profile of each of the five coefficients a,b,c,d and e across all of the orders of the regression $v_n = a_n + b_n T + c_n T^2 + d_n T^3 + e_n T^4$. So, a smooth surface profile defines the optimum voltage compensation level given an input attenuation state and temperature by the following formula $v = a + bT + cT^2 + dT^3 + eT^4$, where, $a = (X + Y\theta + Z\theta^2)$ $b = (X_1 + Y_1\theta + Z_1\theta^2)$ $c = (X_2 + Y_2\theta + Z_2\theta^2)$ $d = (X_3 + Y_3\theta + Z_3\theta^2)$ $e = (X_4 + Y_4\theta + Z_4\theta^2)$ Theta=liquid crystal attenuation level
X,Y,Z=solution to zero order coefficient
$X_1,Y_1,Z_1$=solutions to first order coefficient
$X_2,Y_2,Z_2$=solutions to second order coefficient
$X_3,Y_3,Z_3$=solutions to third order coefficient
$X_4,Y_4,Z_4$=solutions to fourth order coefficient The fifteen coefficient solutions (Xn,Yn,Zn) where n=0 to 4, may be generated by Mathematica, using the Fit(data, {1,x,x^2, . . . ,x^n},x) function or other suitable software packages capable of performing curve fitting regression.

Step four is the final step in the calibration process of FIG. 11, process 606, and results in storing the coefficients in the liquid crystal control system which is now described.

Figure 12:
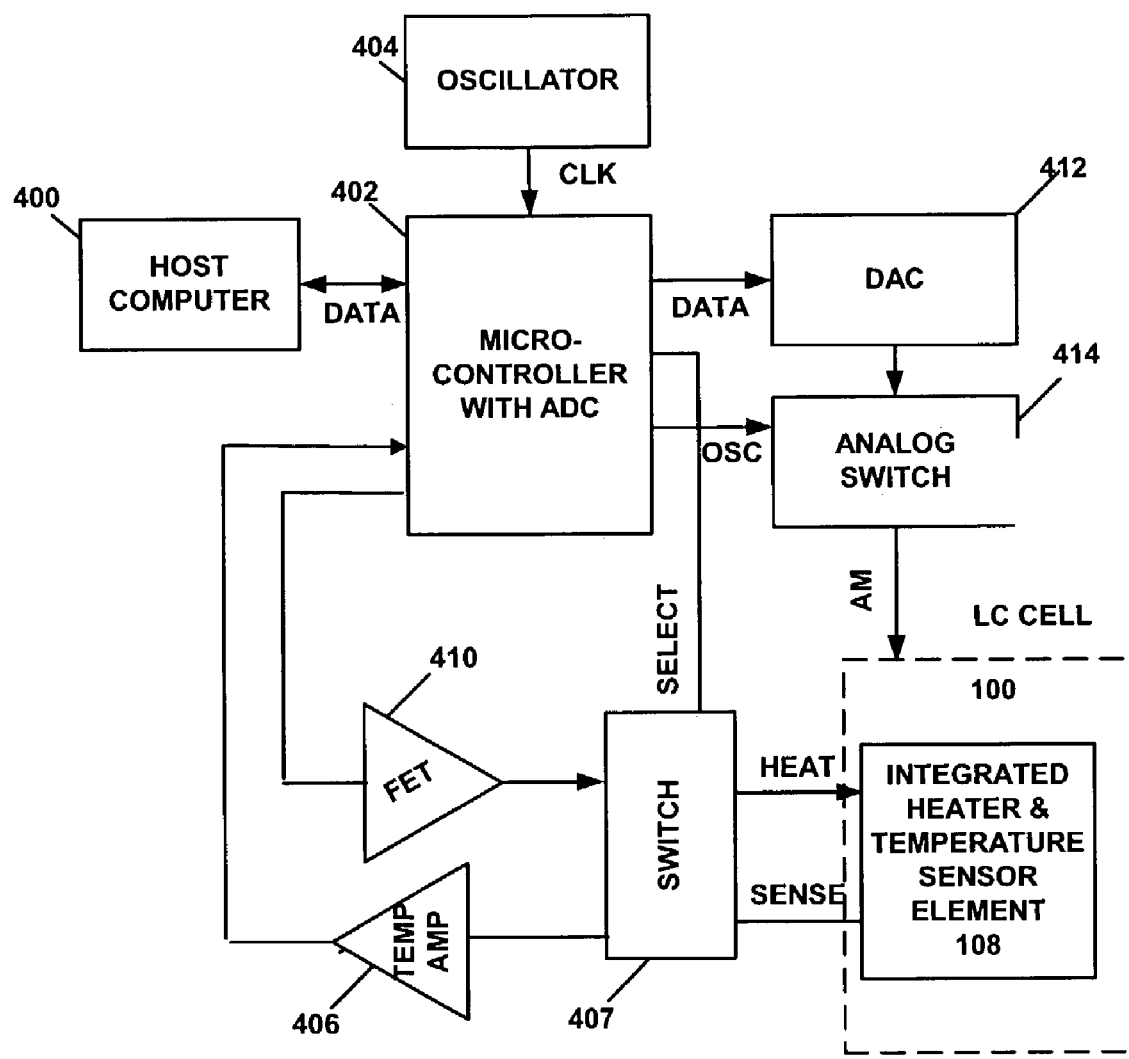
FIG. 12 shows a block system diagram for the electronic control and thermal management system of the present invention.

The coefficients that profile the liquid crystal characteristics may be stored in microcontroller 402 memory (FIG. 12) by flashing the memory of the microcontroller with the appropriate 15 coefficient values.

The thermal compensation system of the present invention operates by reading the temperature of the liquid crystal cell and adjusting the voltage drive of the cell based on the cell state. The cell state may typically be OFF, ON or operate in a variable mode. The cell state may be stored in the microcontroller 402 and also be configured via the host computer 400.

Figure 10B:
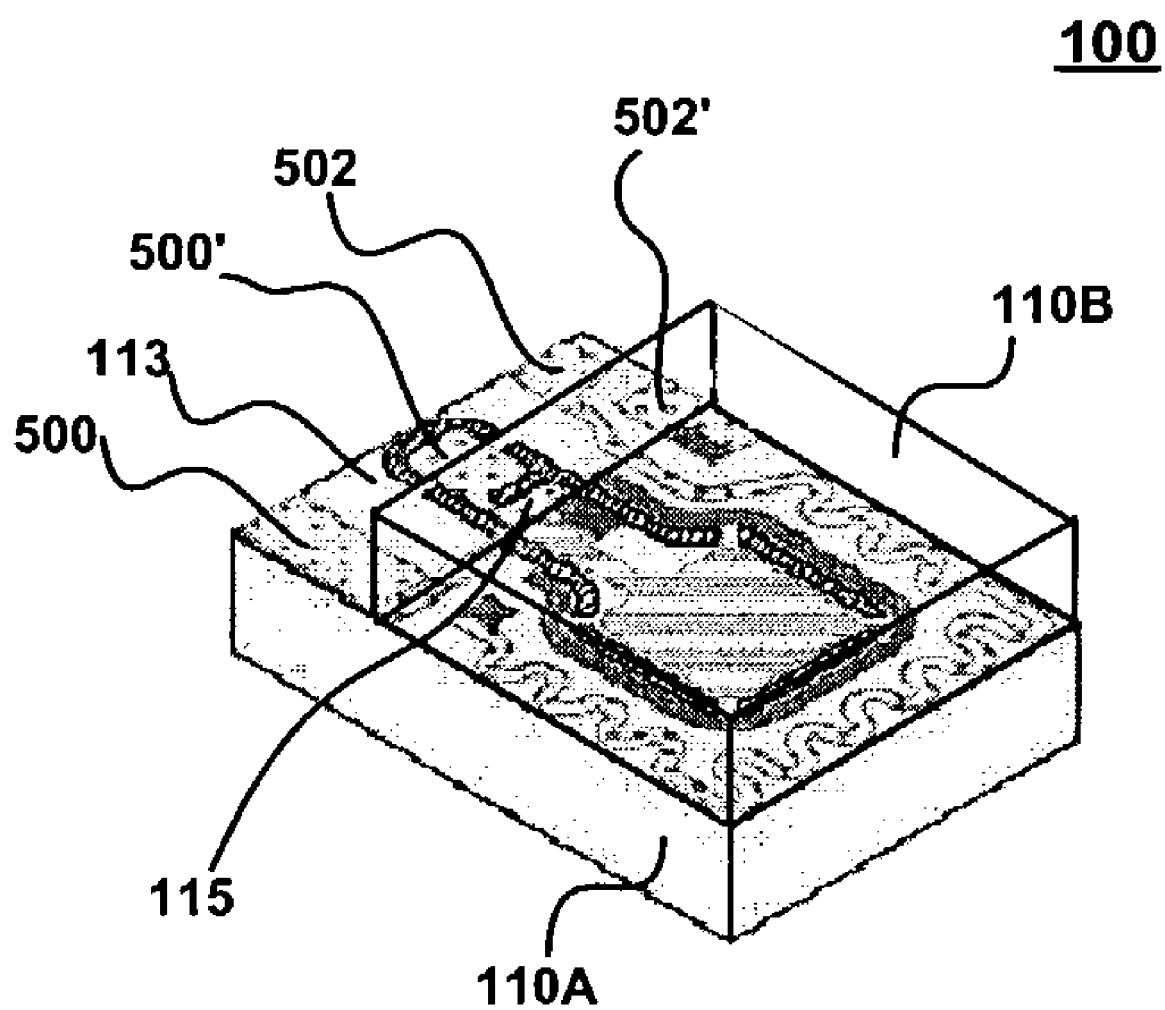
FIG. 10B is an isometric view showing a liquid crystal cell at the termination of the fabrication process.

Microcontroller may be a PIC microchip having an internal analog digital converter and operating with a 10 Mhz crystal oscillator 404 clock. The microcontroller may be connected to a digital analog converter (DAC) configured to provide an output voltage level in response to a configuration pulse stream from the microcontroller over a serial interface. The output of the DAC connects to the input of an analog switch 414 which is clocked by a port pin of the microcontroller at approximately 1.2 khz. DATA passed to the DAC defines the amplitude of an AM transmission over a 1.2 khz carrier that produces a differential voltage drive to the liquid crystal cell electrodes 500 and 500' (FIG. 10B).

A temperature sensor reading may be provided by the internal integrated heater/temperature sensor from an external device. One of the heater/temperature sensor electrodes 502 or 502' of the liquid crystal cell 100 may be grounded while the other may connect to switch 407. Switch 407 may selectively engage the integrated heater/temperature sensor element 108 in a sense or heat mode. More specifically, switch 407 may be configured ON to connect the ungrounded heater/temperature electrode through instrumentation amplifier 406 to an ADC coupled to the microcontroller which reads the temperature on the liquid crystal cell, or it may be configured OFF so that power amplifier FET 410, which may be controlled by a pulse train from microcontroller 402 and applies a voltage potential to operate the device 108 as a heater.

In a temperature sense feedback closed loop operation, which shall hereby be referred to as the loop embraced by process steps 607 through 609 of FIG. 11, the microcontroller reads the temperature of the liquid crystal cell and calculates the voltage drive based on the sensed temperature, T, and the current state of the liquid crystal cell, Theta. The fifteen coefficients are plugged back into the fourth order regression formula to establish a smooth surface profile delineating an optimal voltage to supply to liquid crystal cell for a given temperature and cell attenuation level:

$$v = (X + Y\theta + Z\theta^2) + (X_1 + Y_1\theta + Z_1\theta^2)T +$$
$$(X_2 + Y_2\theta + Z_2\theta^2)T^2 + (X_3 + Y_3\theta + Z_3\theta^2)T^3 + (X_4 + Y_4\theta + Z_4\theta^2)T^4$$

The new voltage value V is computed and transmitted to the DAC 412 which supplies the appropriate amplitude DC voltage into the clocked analog switch 414 to produce the temperature compensated AM voltage drive to the liquid crystal cell.

The liquid crystal cell may also be maintained about a reference temperature. Process step 609 with respect to FIG. 11 involves the application of heat to maintain the temperature of the liquid crystal cell about a reference temperature. The reference temperature may be above the ambient room temperature or above the temperature of any carrier device that may be coupled to the LC cell. The selection of a reference temperature above the ambient temperature will result in the tendency of the LC cell to cool to meet the ambient temperature after the application of a heat burst. A counter thermal bias is therefore generated to support temperature stability about the reference temperature.

Microcontroller memory may store the reference temperature, the value of the current temperature, historical temperatures, and, historical levels of heat applied to the LC cell. The value of the sensed temperature T at every instance may be compared against the reference temperature to determine the amount of heat to apply to the liquid crystal cell. An 8 bit analog digital converter will provide approximately ⅓ of a degree of temperature sensing resolution over the desired temperature range, so the example system may provide for temperature stability about a reference temperature to within ⅓ degree Celsius. At every instance of process step 609, a threshold detector routine stored in microcontroller ROM may trigger a control function if the sensed temperature of the liquid crystal cell falls below the desired operating reference temperature. The control function may determine how much heat to apply to the liquid crystal cell. The control function may utilize error minimizing routines that track the change in temperature across multiple instances of process step 609. The error correcting routines may store the previous temperature reading T0 along with the previous amount of heat applied to the liquid crystal cell H0. The temperature reading and every succeeding temperature reading T1 may be compared against T0 to determine the amount of temperature change resulting from the previous heating of the liquid crystal cell. Heat may be applied to the liquid crystal cell by way of the FET power driver as described above. The heater may be triggered at a fixed or variable duty cycle and controlled using frequency or amplitude modulation.

Although the present invention has been fully described by way of description and accompanying drawings, it is to be noted that various changes and modifications will be apparent to those skilled in the art. For example, various patterns may be used to form the spacer element, metal gasket and integrated heater/temperature sensor elements of the basic cell platform. Use of external temperature sensors and heaters in part or whole may be applied using the temperature compensation methods and regression of the present invention. The metal gasket may be modulated to provide heating function in addition to its function as a moisture barrier support membrane. Epoxy gaskets may be used in combination with metal gasket elements in part or whole, and the metal gasket elements may comprise a single solder cap. Anchoring and aligning the liquid crystal material in a cell may also be performed using photo alignment material, Staralign by Vantio of Switzerland or or other known alignment methods, including laser etching. Anchoring the liqiud crystal material in the cell (described hereunder as step five) may be perforrmned before patterning of the polyimide (describedc hereunder as step four). The process steps for the closed loop temperature feedback may also be rearranged such that the heating process is performed prior to applying the voltage drive. The order of fitting voltage with each dimension of the three dimensional surface is reversable and other three dimensional surface fitting algorithms may be used, including but not limited to those that describe a surface with one dimension fitting a fourth degree polynomial and the other dimension fitting a second degree polynomial. Amplitude or frequency modulation may be used to drive the liquid crystal cell. The fourth embodiment of this invention may be configured with the integrated temperature sensor/heating element of the third embodiment of the present invention. The liquid crystal cell may not be limited to a single pixel. The liquid crystal cell may be comprised of multiple pixels. Arrays of liquid crystal cells may be formed, including arrays of cells having one or more pixels. Therefore, it is to be noted that various changes and modifications from those abstractions defined herein, unless otherwise stated or departing from the scope of the present invention, should be construed as being included therein and captured hereunder with respect to the claims.

The invention claimed is:

1. A liquid crystal cell platform, comprising:
a first substrate having a first electrode and first alignment layer,
a second substrate placed in opposition to the first substrate and having a second electrode and second alignment layer,
liquid crystals coupled between the first and second substrates,
a spacer element coupled between the first and second substrates, and
a thin film metal gasket element bonded to the facing surfaces of the first and second substrates,
a sub wavelength optical element or nanostructed grating disposed on said first or second substrate,
active thermal elements disposed on the first and second substrates, and
at least one VIA formed by a layer of the metal gasket element connected to said first or second electrode.

2. A liquid crystal cell platform, comprising:
a first substrate having a first electrode and first alignment layer,
a second substrate placed in opposition to the first substrate and having a second electrode and second alignment layer,
liquid crystals coupled between the first and second substrates,
a spacer element coupled between the first and second substrates and
a thin film metal gasket element bonded to the facing surfaces of the first and second substrates,
a sub wavelength optical element or nanostructed grating disposed on said first or second substrate,
active thermal elements disposed on the first and second substrates, and
at least one VIA formed between the active thermal elements by a layer of the metal gasket element.

3. A liquid crystal cell platform, comprising:
a first substrate having a subwavelength optical element on one side and an electrode and alignment layer on the opposing side,
a second substrate having second electrode and second alignment layers placed in opposition to first substrate electrode and alignment layers,
liquid crystals coupled between the first and second substrates
a spacer element coupled between the first and second substrates,
a thin film metal gasket element bonded to the facing surfaces of the first and second substrates,
active thermal elements that may either be supplied with a voltage to heat the thermal element or whose resistance may be read and measured to determine temperature at any instance, the active thermal elements being deposited onto the first and second substrates,
and wherein a VIA formed by a layer of metal gasket material connects the thermal elements on the first and second substrates.

* * * * *